Nov. 25, 1952     R. A. SATTERFIELD     2,619,544
AUTO CIRCUIT FOR DRIVE-IN THEATERS
Filed Oct. 5, 1949

RICHARD A. SATTERFIELD,
INVENTOR.

BY

ATTORNEY

Patented Nov. 25, 1952

2,619,544

UNITED STATES PATENT OFFICE 2,619,544

AUTO CIRCUIT FOR DRIVE-IN THEATERS

Richard A. Satterfield, Winston-Salem, N. C.

Application October 5, 1949, Serial No. 119,608

1 Claim. (Cl. 179—1)

This invention relates to equipping an automobile which has a radio and loudspeaker therein for use when it drives into an outdoor theatre so that the loudspeaker which forms a part of the car radio can be employed instead of having to insert a loudspeaker from a suitable cabinet adjacent the parking place of the automobile into the automobile.

As is well known, in drive-in or outdoor theatres a plurality of posts or columns are arranged usually one post between two parking spaces and this post usually has a cabinet thereon mounting two loudspeakers which are connected to the sound apparatus of the picture being shown. When a customer drives into a parking place, an attendant hands the loudspeaker from a cabinet to an occupant of the car and the loudspeaker is hung somewhere within the car and if it is cold weather or inclement weather the car windows can be raised most of the way to elevated position, but still it is necessary to leave a crack in the window through which the cord of the loudspeaker is passed.

It is therefore an object of this invention to provide a wiring circuit for an automobile which is equipped with a radio and a loudspeaker and said circuit having a socket disposed on one or both sides of the automobile and instead of having loudspeakers attached to cords on a post between a pair of adjacent cars, it is only necessary to have a cord having a plug which can be plugged into a plug in the side of the automobile and the operator of the automobile merely flips a switch to disconnect the car loudspeaker from its associated radio and connects it to the circuit leading to one of the plugs in the side wall of the automobile so the conventional loudspeaker of the car radio can be employed for receiving the program from the picture being displayed.

Figure 1:
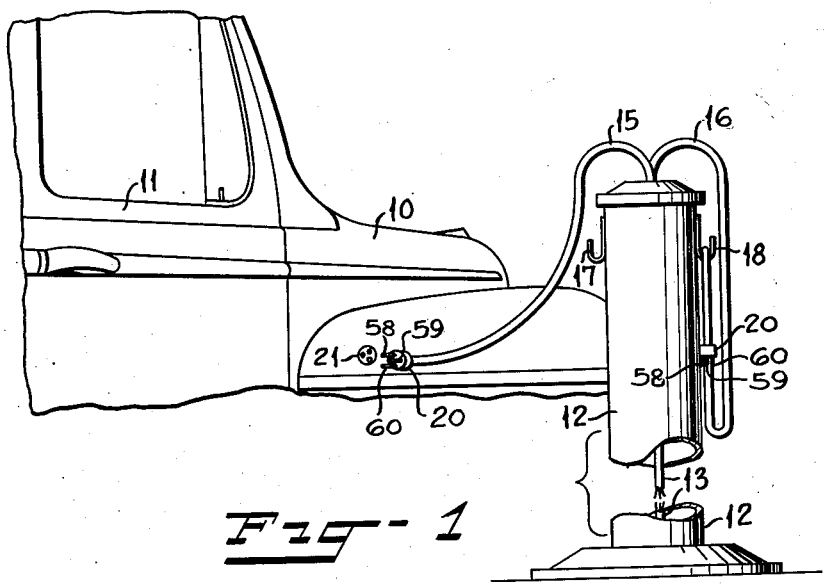
Figure 2:
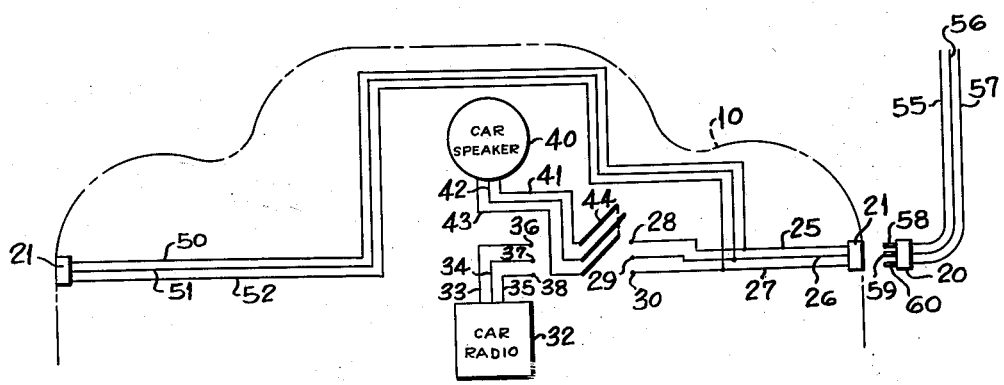

Some of the objects of the invention having been stated, other objects will appear as the description proceeds, when taken in connection with the accompanying drawings in which Figure 1 is an elevation showing a portion of an automobile and a post or column with a pair of cables adapted to be attached to a socket in the side of the automobile;

Figure 2 is a schematic wiring diagram of an automobile having a radio and loudspeaker associated therewith and the manner in which the sound system of the outdoor theater can be connected to the loudspeaker in the automobile.

Referring more specifically to the drawings, the numeral 10 indicates a portion of an automobile and in which a front door 11 is shown. In an outdoor theatre there is usually disposed a column between each pair of parking places, this column being indicated at 12 and preferably being hollow and having a cable 13 extending upwardly through the same, the cable 13 being connected to the sound projection apparatus of the moving picture projector. Usually there are two cables for each column and these are indicated at 15 and 16 and suitable hooks 17 and 18 are provided on which these cables may be suspended when not in use. Each of these cables has a male socket 20 which is usually provided with two or more prongs which are adapted to be inserted into a female plug 21 disposed in one or both sides of an automobile preferably in the front fenders thereof. From each of these sockets 21, wires 25, 26 and 27 are led to suitable switch posts 28, 29 and 30. The automobile which is equipped with a radio has a radio proper indicated at 32 having wires 33, 34 and 35 leading therefrom to suitable contacts 36, 37 and 38. The automobile is also usually equipped with a loudspeaker 40 having wires 41, 42 and 43 leading therefrom to a knife switch indicated broadly at 44. From the other side of the car where the other female plug 21 is located suitable wires 50, 51 and 52 are led transversely of the automobile and are connected to the wires 25, 26, 27 respectively.

Each of the cables 15 and 16 usually have therein wires 55, 56, and 57 which are connected to the three prongs 58, 59 and 60 of each of the male plugs 21.

It is thus seen that while the automobile is in normal use, the master switch 44 will be moved to the left into engagement with the contacts 36, 37 and 38 which will connect the loudspeaker of the car radio with the car radio itself. Now, when the car drives into an outdoor theatre equipped with this invention, the attendant will plug in one of the plugs 20 into the female plugs 21 and the master switch 44 will be turned from left to right in Figure 2 to engage the contacts 28, 29 and 30 which will disconnect the loudspeaker in the automobile from its associated radio and will connect it directly to the sound system of the movie projector.

This invention will eliminate the costly equipment which is exposed to outdoor weather much of the time as now employed by outdoor theatres and will also enable automobiles to be completely closed up during extremely cold weather or during a rain storm and thus will be quite an improvement over the method of having to pass a loudspeaker from a post into an automobile which has driven up for witnessing of a picture in an outdoor theatre.

In the drawings and specification there has been set forth a preferred embodiment of the invention, and although specific terms are employed, they are used in a generic and descriptive sense only, and not for purposes of limitation, the scope of the invention being defined in the claim.

I claim:

An electrical circuit for automotive vehicles having a body provided with side walls and having a radio receiver and a loud speaker and having a first plurality of electrical conductors leading from the receiver, a second plurality of electrical conductors leading from the loud speaker, a female socket in at least one side wall of the body, a third plurality of electrical conductors connected to the female socket, a double throw knife switch provided with pivot posts connected to the second plurality of conductors, the first and third plurality of conductors having each a set of knife receiving contacts disposed on opposed sides of the pivot posts whereby upon the swinging of the knife switch from one set of receiving contacts to the other, the speaker can be selectively connected to the receiver or the female socket.

RICHARD A. SATTERFIELD.

REFERENCES CITED

The following references are of record in the file of this patent:

UNITED STATES PATENTS

| Number | Name | Date |
|---|---|---|
| 762,684 | Case | June 14, 1904 |
| 1,979,313 | Cotter | Nov. 6, 1934 |
| 1,981,689 | Deakin | Nov. 20, 1934 |
| 2,109,602 | Weiss | Mar. 1, 1938 |
| 2,138,598 | Goldsmith | Nov. 29, 1938 |
| 2,144,566 | Dreisback | Jan. 17, 1939 |
| 2,280,465 | Barrett | Apr. 21, 1942 |
| 2,429,607 | Capen | Oct. 28, 1947 |
| 2,463,339 | Wetzel et al. | Mar. 1, 1949 |
| 2,469,986 | Phyfe | May 10, 1949 |
| 2,501,048 | Haller | Mar. 21, 1950 |

OTHER REFERENCES

"Cannon Electric Development"—March, 1944 Edition, page 3.